United States Patent
Szadkowski et al.

[11] Patent Number: 5,908,100
[45] Date of Patent: Jun. 1, 1999

[54] VIBRATION DAMPENING CLUTCH DRIVEN DISC

[75] Inventors: Andrew Szadkowski; Michael J. Hall, both of Fort Wayne; Rock L. Hartshorn, Auburn, all of Ind.

[73] Assignee: Eaton Corporation, Cleveland, Ohio

[21] Appl. No.: 08/906,404

[22] Filed: Aug. 5, 1997

Related U.S. Application Data

[62] Division of application No. 08/533,165, Sep. 22, 1995, Pat. No. 5,657,845.

[51] Int. Cl.$^6$ .................................. F16D 3/14; F16D 3/66
[52] U.S. Cl. ............................................ 192/214.1; 464/68
[58] Field of Search ............................... 192/30 V, 70.17, 192/210.1, 213.12, 213.22, 213.31, 214.1; 464/66, 68, 160, 161

[56] References Cited

U.S. PATENT DOCUMENTS

| | | |
|---|---|---|
| 1,727,153 | 9/1929 | Ahlene . |
| 2,321,941 | 6/1943 | Rose . |
| 2,613,785 | 10/1952 | Mohns . |
| 2,636,363 | 4/1953 | Nutt . |
| 2,674,863 | 4/1954 | Thelander . |
| 3,578,121 | 5/1971 | Maurice . |
| 3,938,635 | 2/1976 | Davies et al. ............ 192/213.31 |
| 4,351,168 | 9/1982 | Prince et al. . |
| 4,606,450 | 8/1986 | Ball et al. . |
| 4,626,226 | 12/1986 | Kajikawa et al. ............ 192/214.1 X |
| 4,715,485 | 12/1987 | Rostin et al. . |
| 4,904,226 | 2/1990 | Chasseguet et al. . |
| 5,065,642 | 11/1991 | Kagiyama et al. . |
| 5,634,543 | 6/1997 | Hashimoto et al. . |
| 5,634,851 | 6/1997 | Albers et al. . |

*Primary Examiner*—Richard M. Lorence
*Attorney, Agent, or Firm*—Dykema Gossett PLLC

[57] ABSTRACT

A disclosed clutch driven disc assembly includes a hub having an axis of rotation. A driven disc of the assembly is rotatably disposed over the hub and has a friction element disposed thereon. The disc also has a plurality of spring openings radially disposed between the hub and the friction element. A reinforcing plate having a plurality of spring openings aligned with the spring openings in the disc is fixed to each side of the disc. A cover plate having a plurality of spring openings is disposed over each of the reinforcing plates with the spring openings of all parts aligned. The cover plates are fixed to the hub for rotation therewith. A plurality of compression coil springs are disposed in the spring openings with the springs oriented such that relative rotation between the hub and the disc tends to compress the springs. An end cap is disposed at each end of the springs with a cap portion engaging the end of the spring and a pin portion extending from the cap portion disposed within coils of the springs whereby the pin portions prevent the spring from buckling when it is compressed as a result of relative rotation between the hub and the disc.

4 Claims, 4 Drawing Sheets

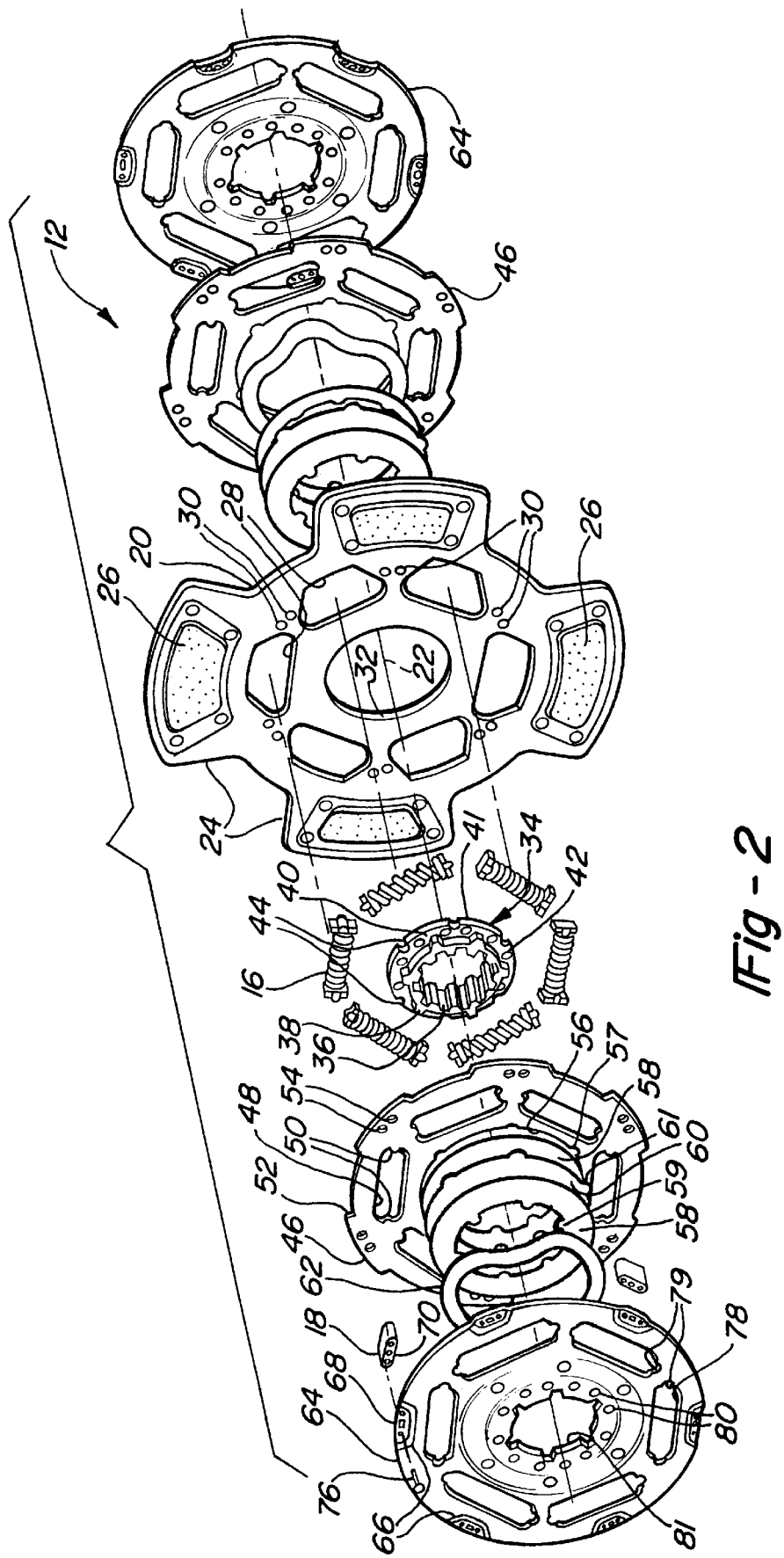

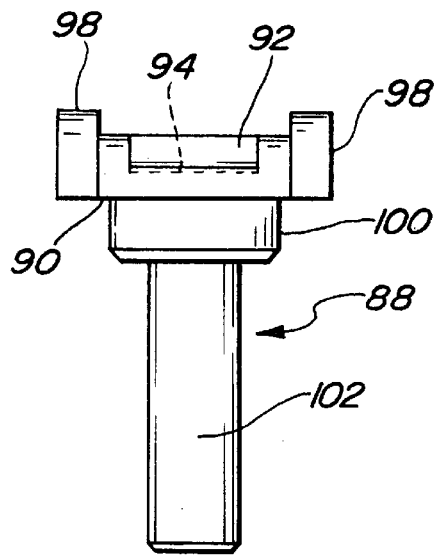
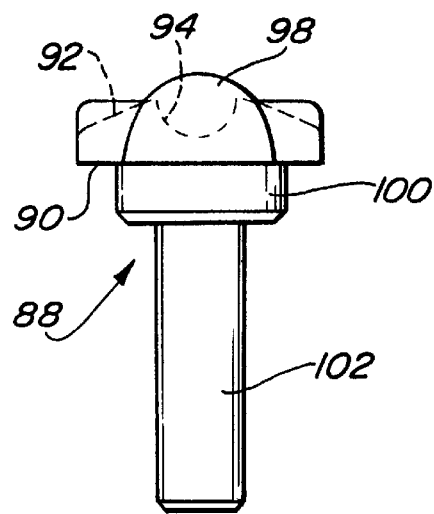
Fig - 4
Fig - 5
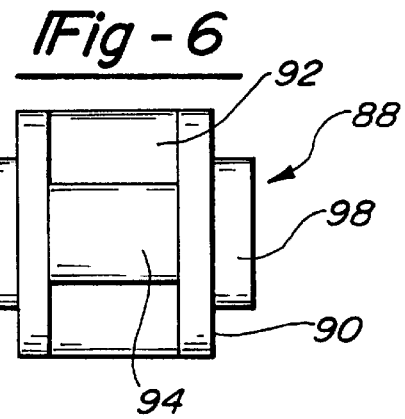
Fig - 6
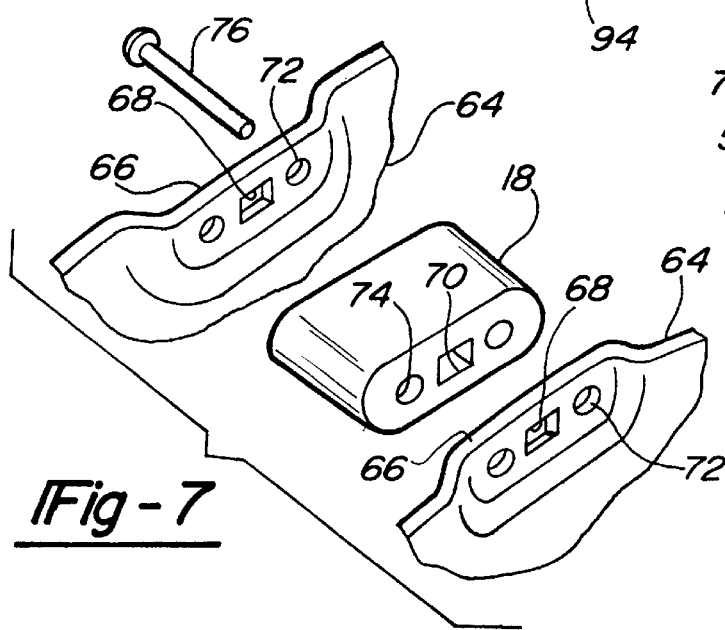
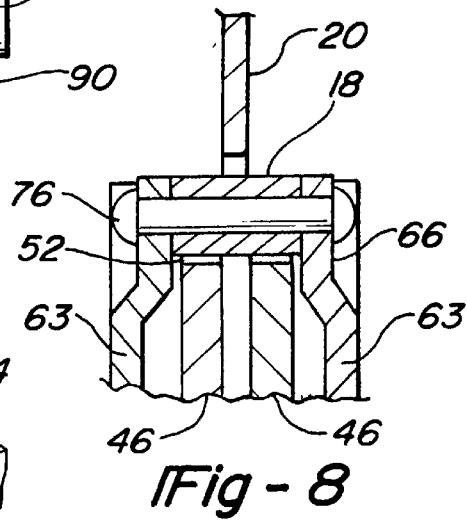
Fig - 8
Fig - 7

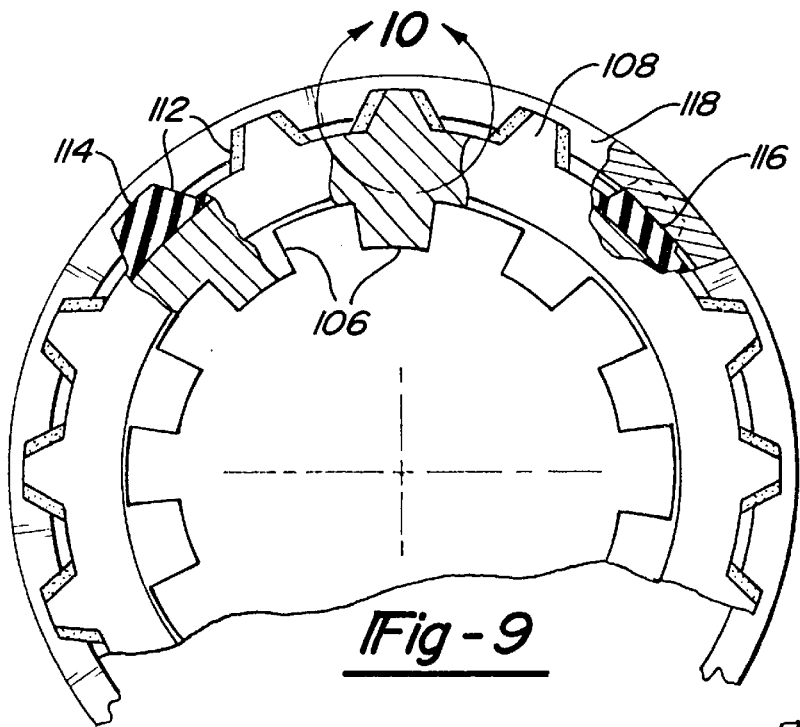
Fig-9
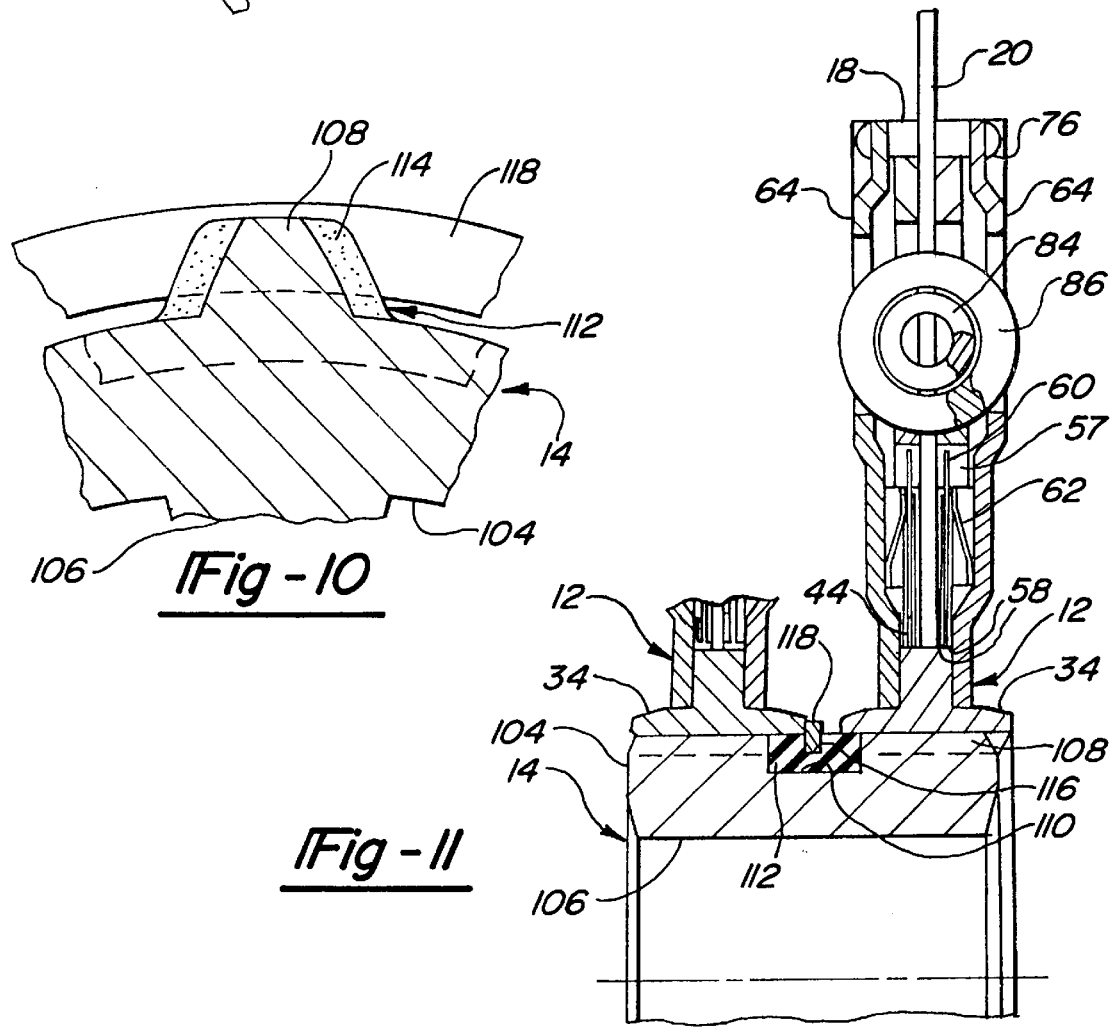
Fig-10
Fig-11

VIBRATION DAMPENING CLUTCH DRIVEN DISC

This is a divisional of application Ser. No. 08/533,165 filed on Sep. 22, 1995, now U.S. Pat. No. 5,657,845.

FIELD OF THE INVENTION

This invention relates in general to friction clutches and in particular to tuning and dampening means of clutch driven disc assemblies.

BACKGROUND OF THE INVENTION

Clutches are well known devices used to selectively connect a source of rotational power, such as the crankshaft of an internal combustion engine and its flywheel, to a driven mechanisms such as a transmission. When the engine is connected with the transmission by the clutch, vibrations are transmitted through the clutch and into the transmission and other drivetrain components, producing undesirable noise conditions such as gear rattle. Additionally, torque spikes of high magnitude at drivetrain resonances which over time could damage the transmission and/or the other drivetrain components.

Clutches have long employed a plurality of compression springs between a clutch hub engaged with a transmission input shaft and a clutch disc engaged with the engine flywheel These springs are typically disposed in spring pockets circumferentially located around the clutch hub. Compression of the springs is limited by a stop disposed between the hub and the disc limiting relative rotation therebetween. The springs provide some isolation between the engine and transmission of firing pulses of the engine and other engine speed fluctuations. However, point loading between the springs and the spring pockets occurs at ends of the springs, producing wear of one or both parts. Also, within the range of travel permitted by the stop or stops, the springs tend to move relatively freely within the pockets, bowing and rubbing against the sides of the pockets. This spring motion and wear may potentially lead to the springs breaking, or to an increase in the size of the spring pocket, diminishing the dampening effectiveness of the clutch and potentially enabling the spring to escape the clutch driven disc assembly.

One path of vibration communication from the engine to the transmission particularly difficult to dampen while maintaining other desired clutch performance characteristics is the splined interface between the hub of the driven disc and the input shaft of the transmission The engaging splines must fit loosely enough to slide into each other for assembly purposes, and therefore have no preload against each other. It is therefore necessary to have a small amount of lash between the mating splines. However, the engaging splines transmit engine vibrations into the transmission. Vibrations are similarly communicated through the splined interface in clutches employing twin driven discs Each disc has a hub with a spline engaging an external spline of a common inner hub. The inner hub in turn has an inner spline engaging the transmission input shaft. To reduce the resultant potential for noise, it is known to provide spline interfaces with increased circumferential clearance between the splines, combined with an elastic spring or a frictional dampener between the splined elements. Known springs and frictional dampeners, however, have many parts and are difficult to assemble.

Also of concern is the ability of the driven disc assembly to become completely disengaged from the flywheel and the pressure plate which is influenced by the axial stiffness of the driven disc assembly If the clutch driven disc hub axially hangs-up, or sticks, on the input shaft, then the clutch will not completely release, and the driven disc will tend to drag against the flywheel.

Yet another concern with twin driven disc clutches relates to their assembly. Although most driven discs are nearly symmetrical when viewed from the side, there is typically an axial offset in one direction or the other. Without careful attention by the assemblers one or both of the driven discs may be placed on the inner hub in the incorrect direction, an error which, even if caught immediately, will require additional time to correct.

SUMMARY OF THE INVENTION

A disclosed clutch driven disc assembly includes a hub having an axis of rotation. A driven disc of the assembly is rotatably disposed over the hub and has a friction element disposed thereon. The disc also has a plurality of spring openings radially disposed between the hub and the friction element. A reinforcing plate having a plurality of spring openings aligned with the spring openings in the disc is fixed to each side of the disc. A cover plate having a plurality of spring openings is disposed over each of the reinforcing plates with the spring openings of all parts aligned. The cover plates are fixed to the hub for rotation therewith. A plurality of compression coil springs are disposed in the spring openings with the springs oriented such that relative rotation between the hub and the disc tends to compress the springs. An end cap is disposed at each end of the springs with a cap portion engaging the end of the spring and a pin portion extending from the cap portion disposed within coils of the springs whereby the pin portions prevent the spring from buckling when it is compressed as a result of relative rotation between the hub and the disc.

Also disclosed is a clutch driven disc assembly having a hub with an axis of rotation and a plurality of axially oriented notches on an outer diameter surface. A driven disc is rotatably disposed over the hub. A reinforcing plate is fixed to each side of the disc. The reinforcing plates each have a central opening surrounding the hub with a plurality of axially extending notches therein. A cover plate is disposed over each of the reinforcing plates and has a plurality of spring openings therein aligned with spring openings in the reinforcing plates. The cover plates are fixed to the hub for rotation therewith. A plurality of compression coil springs are functionally disposed between the hub and the disc. A first friction plate is rotatably engaged with the hub. A second friction plate is rotatably engaged with the reinforcing plate. An annular friction spring is disposed between the friction plates and one of the cover plate and the reinforcing plate.

Additionally disclosed is a clutch driven disc assembly having a hub with an axis of rotation and a driven disc rotatably disposed relative to the hub. Reinforcing plates are fixed to the driven disc on both sides thereof, each having a plurality of notches around an outer periphery of the reinforcing plates. Cover plates are fixed to the hub and disposed over the reinforcing plates. Compression coil springs are functionally disposed between the hub and the disc. Stops are fixed between the two opposed cover plates and are disposed in the notches in the periphery of the reinforcing plate. The stops engage ends of the notches at travel limits, thereby limiting relative rotation between the hub and the disc. The stops have a length relative to the length of the notch sufficient to prevent the springs from being collapsed to their compressed height.

Further disclosed is a twin disc clutch including a pair of clutch driven disc assemblies, each driven disc assembly having a splined aperture. An inner hub connects the two driven disc assemblies and has external spline teeth smaller than spline gaps receiving spline teeth with a dampening element disposed thereon. The dampening element is an elastomeric polymer with axial splines aligned with and larger than the axial splines of the hub. A snap ring disposed midway along the inner hub circumscribes the dampening element and restricts axial motion of the inner hub with respect to the driven discs.

The present invention can be best understood from the following specification and drawings of which the following is a brief description.

BRIEF DESCRIPTION OF THE DRAWINGS

FIG. 2 is a perspective exploded view of a clutch driven disc assembly.

FIG. 4 is a view in the circumferential direction of an end cap of the present invention.

FIG. 5 is a view in the axial direction of a side cap of the present invention.

FIG. 6 is a view in the radial direction of an end cap of the present invention.

FIG. 7 is an exploded view of a portion of the driven disc assembly.

FIG. 8 is a sectional side view of a portion of the clutch driven disc assembly in the direction of arrows 8 in FIG. 1.

FIG. 9 is a planar view of a portion of the center of the twin disc assembly.

FIG. 10 is an enlarged view of the portion of FIG. 9 in circle 10.

FIG. 11 is a sectional side view of a portion of the twin disc assembly of FIG. 1.

DESCRIPTION OF A PREFERRED EMBODIMENT

Figure 1:
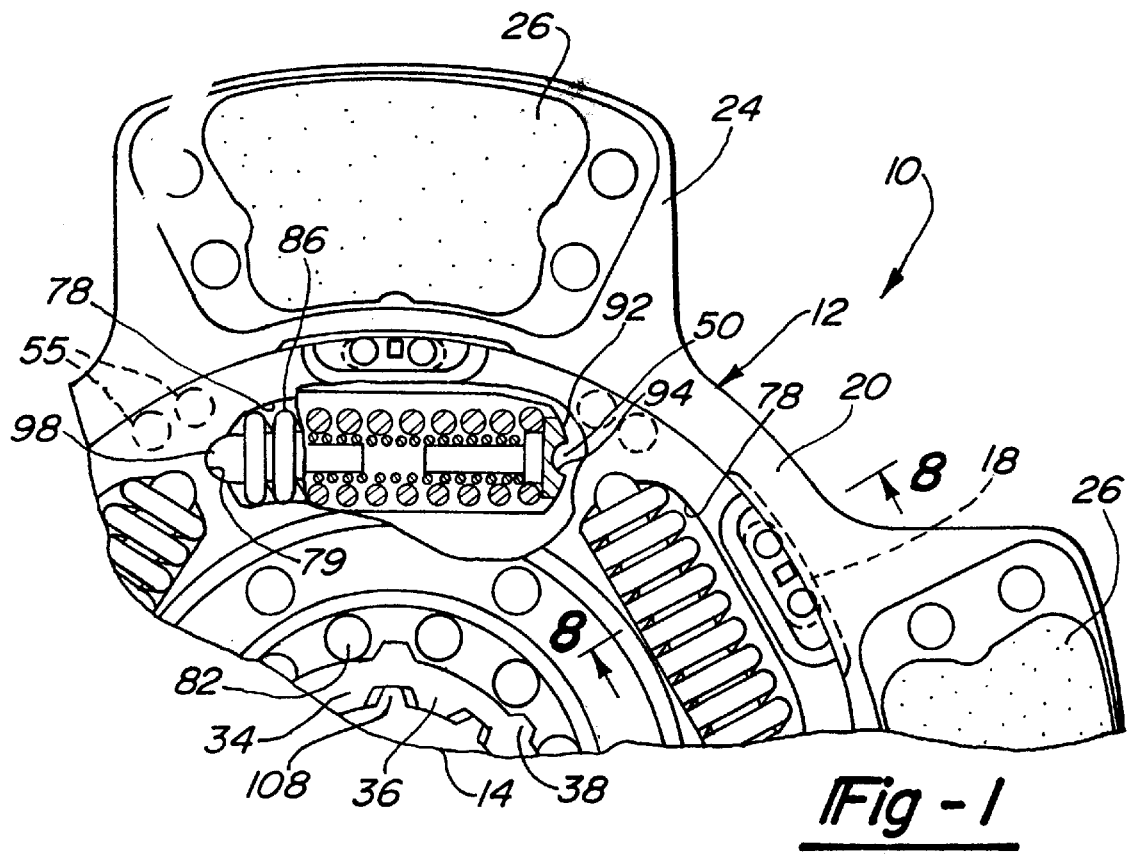
FIG. 1 is a planar, view of a portion of a clutch driven disc assembly incorporating the present invention.

A twin disc assembly 10 shown in FIG. 1 includes a pair of identical driven disc assemblies 12 slidably disposed on an inner hub assembly 14. Each of the driven disc assemblies 12, best seen in FIG. 2, has six spring assemblies 16 and six stops 18. A driven disc 20 of driven disc assembly 12 is substantially cross shaped and has an axis of rotation 22. Arms 24 of disc 20 each have a friction facing or pad 26 mounted on opposite sides thereof. There are six spring clearance openings 28 radially inward of friction pads 26. A pair of rivet holes 30 are disposed circumferentially between each of spring clearance openings 28. A hub clearance aperture 32 in disc 20 is centered on axis 22.

An outer hub 34 has a plurality of inner splines 36 and outer splines 38. A radial flange 40 extends beyond outer splines 38. Hub 34 is symmetric about flange 40. Flange 40 has an outside diameter 41 fitting within hub clearance aperture 32 which centers inner splines 36 around axis of rotation 22. Twelve axially directed rivet holes 42 are formed in flange 40. Six evenly distributed notches 44 are disposed in flange outer diameter 41.

A pair of reinforcing plates 46 are disposed over opposite sides of disc 20 Each reinforcing plate 46 has six elongated spring openings 48 evenly distributed around axis 22 and aligned with openings 28. Each opening 48 has a radius engagement projection 50 disposed at opposite ends thereof.

Six stop notches 52 are evenly distributed around the periphery of reinforcing plate 46. This outer periphery location minimizes the reaction forces. A pair of rivet holes 54 are circumferentially disposed between each of stop notches 52 and are aligned with rivet holes 30. Rivet holes 54 and 30 receive rivets 55, shown in FIG. 1, to fix plates 46 to disc 20. Reinforcing plates 46 each have a center aperture 56 centered on axis 22 with a diameter larger than flange outside diameter 41. Six notches 57 in reinforcing plate 46 are evenly distributed around center aperture 56.

A mini-clutch pack of friction washers or plates, shown in FIGS. 2 and 11 is disposed within aperture 56 of both reinforcing plates 46. A first friction plate or washer 58 having six teeth 59 on its inside diameter is disposed over flange 40 with teeth 59 disposed in notches 44 and having an outside diameter fitting within center aperture 56. An annular second friction plate or washer 60 is disposed over first friction washer 58 and has an inside diameter fitting over flange 40 and six teeth 61 which fit within notches 57 in aperture 56. Another first friction washer 58 is placed over second friction washer 60 with teeth 59 similarly engaging notches 44 of hub 34. An annular friction spring 62, sized to fit between diameter 32 and diameter 56, is disposed on an outside of friction washers 58 and 60. Engagement of teeth 59 and 61 with their respective notches ensures that friction washers 58 and 60 rotate with hub 34 and plate 46 respectively. Identical cover plates 64 are placed over reinforcing plates 46, preloading friction springs 62 against friction washers 58 and 60 which press against driven disc 20. Placing spring 62 between cover plate 64 and washer 58 advantageously eliminates any relative rotation between spring 62 and its adjacent elements which may cause it to wear prematurely.

There is hysteresis or frictional dampening between hub 34 and disc 20 from the frictional engagement between second washer 60 and first washers 58, as well as between innermost friction washer 58 and disc 20 with hub 34 to disc 20 rotation. It should be appreciated that the magnitude of frictional dampening can be controlled by configuring annular friction spring 62 to induce a predetermined axial load against friction washers 58 and 60, and by electing to have frictional washers on both sides of disc 20 or just one side thereof. However, it should also be appreciated that by having springs 62 on both sides of disc 20, disc 20 and reinforcing plates 46 are automatically centered between cover plates 64.

As best seen in FIGS. 7 and 8, six stops 18 are mounted between opposed cover plates 64 at stop mount depressions 66. Depressions 66 are formed at a periphery of plates 64 and evenly distributed therearound. Square alignment apertures 68 through depressions 66 are aligned with square alignment apertures 70 in stops 18 for easier assembly of cover plates 64 and stops 18. Rivet holes 72 in plates 64 are thereby aligned with rivet holes 74 in stops 18. Rivets 76 are received by aligned holes 72 and 74 to join cover plates 64 together. Stops 18 are disposed within notches 52. Stops 18 and reinforcing plates 46 cooperatively define an axial gap between cover plates 64 and the reinforcing plates 46. Annular friction springs 62 bias driven disc 20 and reinforcing plates 46 to a position mid-way between cover plates 64, bisecting the gap. The gap advantageously enables a small amount of axial movement of disc 20 relative to hub 34, as well as desensitizing driven disc assembly 10 to variations in the flatness of driven disc 20 and reinforcing plates 46. This decreases the cost of driven disc 20 and cover plates 46 because they can now be made to less exacting standards.

Cover plates 64 also have six oblong spring apertures 78 with an arcuate recess 79 at each end. Twelve rivet holes 80, encircling an inside diameter 81 and aligned with holes 42 in flange 34, receive rivets 82 fixing plates 64 and hub 34 together as shown in FIG. 1.

Figure 3:
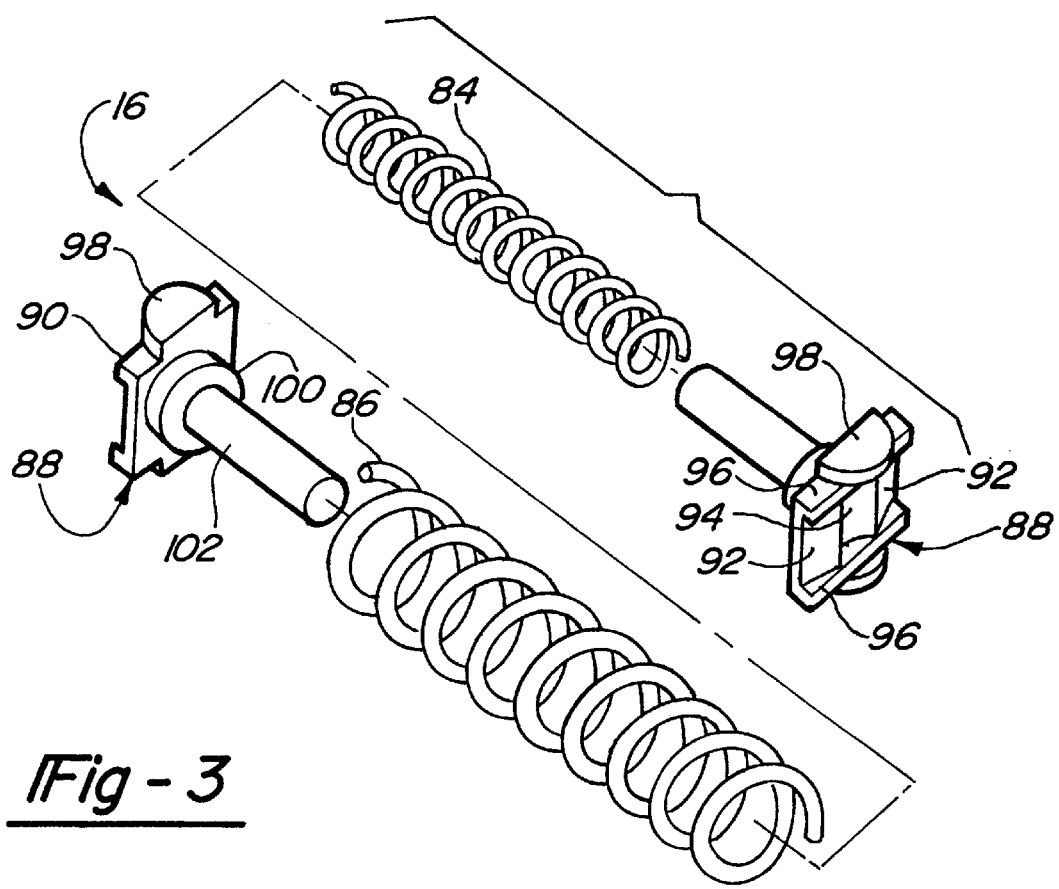
FIG. 3 is a perspective exploded view of the compression coil springs and end caps of the present invention.

Spring assembly 16, best shown in FIGS. 1 and 3, has an inner compression coil spring 84, an outer compression coil spring 86 and end caps 88. End cap 88 has a rectangular cap portion 90 with an arcuate groove 92 and a radiused pocket 94 bisecting groove 92. Pocket 94 engages projections 50 and groove 92 engages the portion of the spring opening 48 beyond engagement projections 50. Pocket sides 96 are disposed between cover plates 64 and reinforcing plates 46, advantageously preventing end caps 88 from rotating and from being displaced in the direction of axis 22. Semicircular outer portions 98 extend from sides 96 and engage arcuate recesses 79 in cover plate 64 enabling caps 88 to roll or pivot in a plane parallel to disc 20 when caps 88 are not contacting projection 50. Guide portion 100 receives outer spring 86, maintaining it in a centered position. Pin portion 102 receives inner spring 84, centering it with respect to outer spring 86.

Inner hub assembly 14, best seen in FIGS. 9–11, includes an inner hub 104 with internal splines 106 for receiving a transmission input shaft and external splines 108 fitting within inner splines 36 of outer hub 34. Hub 104 also has a circumferential groove 110 midway between its ends. A dampening element 112 formed of a rubber-like resilient elastomeric polymer is molded in groove 110. Dampening element 112 has a plurality of external teeth 114 equal in number to the number of external splines 108 on hub 104. A snap ring groove 116 circumscribes dampening element 112 bisecting teeth 114. A metal ring, such as a snap ring 118, or a wire ring is disposed in groove 116. The external spline teeth 108 of inner hub 104, as shown in FIGS. 9 and 10, are appreciably smaller in width than the gaps or spaces between splines 36. Exemplary values of spline dimensions are indicated in the table below.

| Description | Numbers |
| --- | --- |
| Pitch diameter | 2.67 inches (67.8 mm) |
| Number of spline teeth | 16 |
| Space width between outer hub inner splines 36 | .26 inches (6.6 mm) |
| Width of inner hub external spline 108 at pitch diameter | .15 inches (3.8 mm) |
| Dampening element tooth width | .25 inches (6.4 mm) |

Having dampening element teeth 114 wider than external splines 108 is advantageous in that it enables dampening element 112 to cushion contact between inner and outer splines 36 and 108. As torque is applied to clutch assembly 10, dampening element 112 is compressed, allowing inner and outer splines 36 and 108 to contact smoothly and quietly. Fluctuating torsional loads resulting in a momentary loss of contact between splines 36 and 108 are similarly dampened.

A twin disc assembly 10 hash as shown in FIG. 11, one driven disc assembly 12 disposed over a first end of inner hub assembly 14 and a second driven disc assembly 12 disposed over a second end of inner hub assembly 14 with a portion of outer hubs 34 disposed over dampening element 112. Dampening element teeth 114, while larger than external splines 108, are smaller than the space width between inner splines 36. This enables driven disc assemblies 12 to be easily slipped over ends of the inner hub assembly and the dampening element 112. Movement of driven disc assemblies 12 across inner hub assembly 14 is limited by snap ring 118.

The advantage of the features disclosed herein, particularly those features related to the retention of springs 84 and 86, are most apparent when there is relative rotation between disc 20 and hub 34. With relative rotation, overlapping spring openings 48 and 78 become offset, reducing the size of the opening in which springs 84 and 86 are disposed, thereby compressing springs 84 and 86. One end cap 88 is engaged exclusively by projections 50. A second end cap 88 at the opposite end of springs 84 and 86 engages recesses 79 with its radiused outer portions 98. As relative rotation increases toward a maximum, springs 86 and especially 84 have a tendency to buckle which is resisted by pin portions 102. The radiused surfaces of end caps 88 permit controlled rotation thereof, enabling a slight amount of spring bowing in the plane of disc 20 while resisting substantially all tendency to bend laterally outward away from the plane of disc 20. The end caps thus eliminate the need for any surrounding support structure to trap springs 84 and 86. Controlling spring bowing with the use of end caps 88 eliminates undesirable rubbing contact between outer spring 86 and the surrounding discs and plates, thereby minimizing wear of spring 86 and increasing its useful life.

Spring overload and wear produced by coil-to-coil contact, occurring with compression of springs 86 and 84 to their solid height, is prevented by limiting the relative rotation between disc 20 and hub 34 with stops 18 so that springs 86 and 84 are never compressed to their solid heights Relative rotation ends when stops 18 engage ends of notches 52. Notches 52 are of a predetermined circumferential arc length which does not vary. Stops, however, can be varied in length to provide a desired amount of relative rotation while enabling a single type of reinforcing plate 46 to be used for any clutch of a given size. It is desirable to be able to provide an amount of relative rotational displacement between disc 20 and hub 34 which depends on the characteristics of spring assembly 16. For example, it may be desired to have the combination of a low spring rate spring assembly 16 with a large amount of relative rotative displacement. To achieve this, springs 84 and 86 having the desired characteristics are selected and used in combination with a relatively short stop which maximizes the difference in length between itself and notch 52. If, however, it is desired to provide only a small amount of relative rotation between disc 20 and hub 34, then a relatively long stop would be used, minimizing the difference in length between itself and notch 52. This provides a highly desirable tuning feature enabling clutch engineers to configure clutch discs for specific uses which will transmit a minimum of vibration at a minimum in tooling costs.

The advantages of inner hub assembly 14 are also most readily apparent when there is a torsional load between inner hub 104 and disc 20, such as that which would cause relative rotation between disc 20 and hub 34. The engaging splines or teeth 36 and 108 have a curved or involute profile which insures centering between hubs 34 and 104, increases the torque capacity of the hub-to-hub interface, improves axial alignment of hubs 34 relative to hub 104 under torsional load, as well as providing smoother contact between the teeth of hubs 34 and 104. The gap or free travel between splines 36 and 108 in combination with the engagement of splines 108 with dampening teeth 114 introduces a resilient cushioning element which reduces impact loading between splines 36 and 108, yet allows metal-to-metal contact therebetween.

Energy is dissipated by friction washers 58 and 60 being forced into engagement by friction springs 62. The resultant hysteresis does not change significantly over the life of the clutch because the force applied by springs 62 remains essentially constant.

An additional benefit provided by friction springs 62 becomes apparent upon disengagement of the clutch. If there is no relative axial movement of hub 34 with respect to the flywheel, drag of driven disc 20 against the flywheel is greatly reduced by the axial deflection of springs 62 moving driven disc 20 away from the flywheel.

Lastly, driven disc assembly 12 is completely symmetric about disc 20, enabling it to be installed on inner hub 104 facing in either direction. As assembly 14 is also symmetric about snap ring 118, it is impossible to incorrectly assemble a twin disc assembly 10 from two driven disc assemblies 12 and inner hub 104.

Preferred embodiments have been disclosed. A worker of ordinary skill in the art would realize, however, that certain modifications would come within the teaching of this invention. For example, it may be desirable to have more or fewer friction washers in the assembly. Different numbers of rivets could be used to assemble the driven disc assembly. Different types of fasteners could be used in place of rivets. The number of spring assemblies may be varied. Instead of being cross shaped, disc 20 may be completely circular. The following claims should be studied in order to determine the true scope and content of the invention

We claim:

1. A clutch driven disc assembly comprising:

a hub having an axis of rotation;

a driven disc rotatably mounted with respect to the hub for rotation about the axis;

reinforcing plates disposed over each side of the driven disc and fixed to the driven disc for unitary rotation therewith;

cover plates disposed over each of the reinforcing plates and fixed to the hub for unitary rotation therewith and defining an axial gap between the cover plates and the driven disc;

a plurality of compression coil springs functionally disposed between the hub and the driven disc;

an annular first friction plate disposed on a first side of the driven disc and including means for engaging the hub for unitary rotation therewith;

an annular second friction plate disposed on the first side of the driven disc and including means for engaging one of the reinforcing plates for unitary rotation therewith and slidable in an axial direction and adjacent the first friction plate; and an annular friction spring functionally disposed between the friction plates and one of the cover plate on the first side and the driven disc plate wherein the annular friction spring is preloaded between the friction plates and the one of the cover plate on the first side and the first side of the driven disc producing frictional engagement between the first and second friction plates.

2. A clutch driven disc as claimed in claim 1, wherein:

annular first and second friction plates are disposed on a second side of the driven disc and an annular friction spring is functionally disposed between the friction plates and one of the cover plate on the second side and the second side of the driven disc producing frictional engagement between the first and second spring plates, wherein the preload from the annular friction springs on the first side and the second side of the driven disc biases the driven disc to a position midway between the cover plates.

3. A clutch driven disc assembly comprising:

a hub having an axis of rotation;

a driven disc rotatably mounted with respect to the hub for rotation about the axis;

a plurality of compression coil springs functionally disposed between the hub and the driven disc;

an annular first friction plate disposed on a first side of the hub and having a plurality of radially extending engagement features on an inner diameter of the first friction plate rotatably connecting the first friction plate to the hub for unitary rotation with the hub and the first friction plate being slidable in an axial direction;

an annular second friction plate disposed on the first side of the hub and having a plurality of radially extending engagement features on an outer diameter of the second friction plate rotatably connecting the second friction plate for unitary rotation with the driven disc and the second friction plate being slidable in an axial direction and adjacent the first friction plate; and an annular friction spring functionally disposed between the friction plates and one of the driven disc and the hub wherein the annular friction spring is preloaded between the friction plates and the one of the driven disc and the hub on the first side of the hub and resultantly producing frictional engagement between the first and second friction plates.

4. A clutch driven disc as claimed in claim 3, wherein:

the hub has a radially extending flange over which the friction plates are slidably disposed and the flange also defines engagement features slidably receiving the engagement features of the first friction plate, a reinforcing plate is fixed to the driven disc and is configured to slidably receive the friction plates and defines an engagement feature slidably receiving the engagement features of the second friction plate, and a cover plate is disposed over the reinforcing plate and the flange and is fixed to the hub for unitary rotation therewith and defines an axial gap between the cover plate and the hub, with the friction plates being disposed within the axial gap on a first side of the hub.

* * * * *